June 16, 1964 C. W. BERTHIEZ 3,137,207
MILLING AND BORING MACHINE WITH DETACHABLE
TOOL HEAD CARRYING ARM
Filed Aug. 2, 1960 8 Sheets-Sheet 1

INVENTOR
Charles William Berthiez

BY Robert E. Burns

ATTORNEY

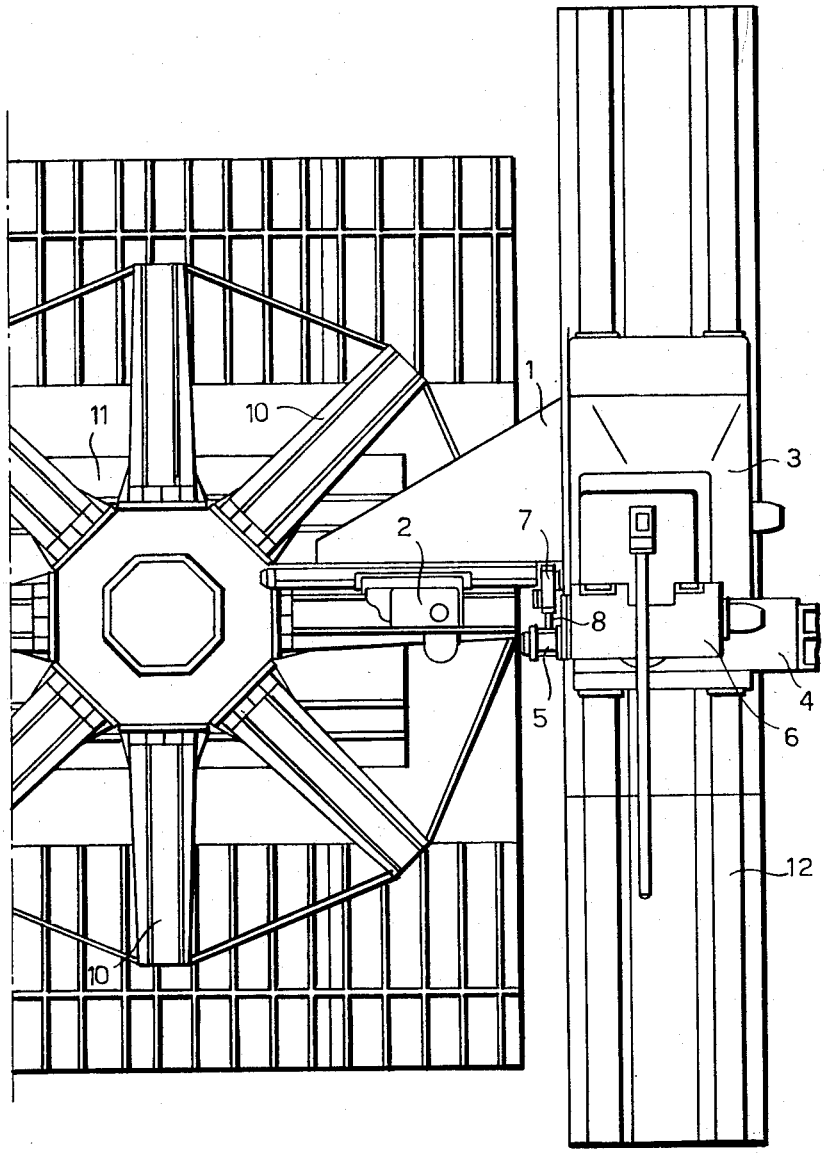

June 16, 1964     C. W. BERTHIEZ     3,137,207
MILLING AND BORING MACHINE WITH DETACHABLE
TOOL HEAD CARRYING ARM
Filed Aug. 2, 1960     8 Sheets-Sheet 3

INVENTOR

Charles William Berthiez

BY

ATTORNEY

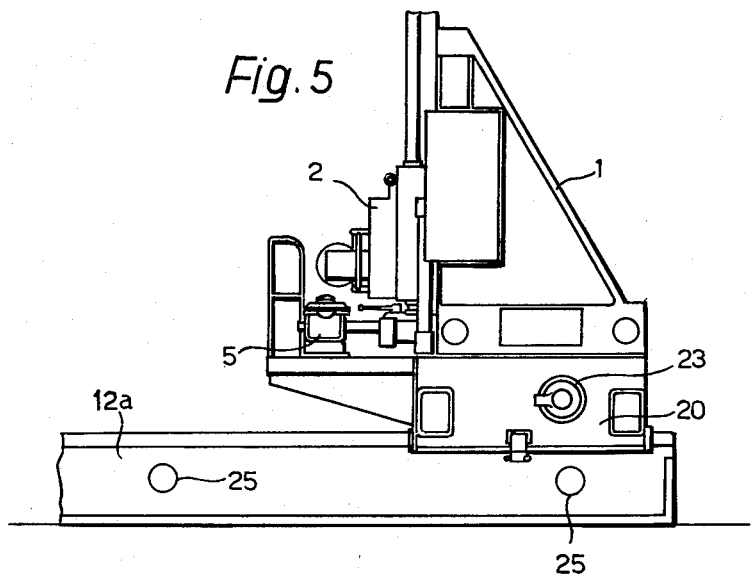
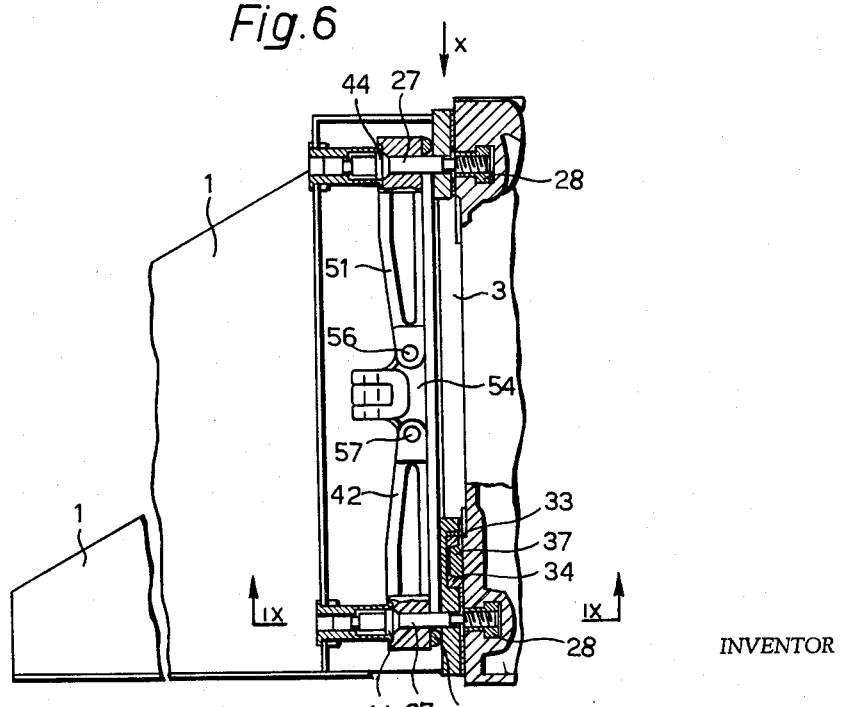

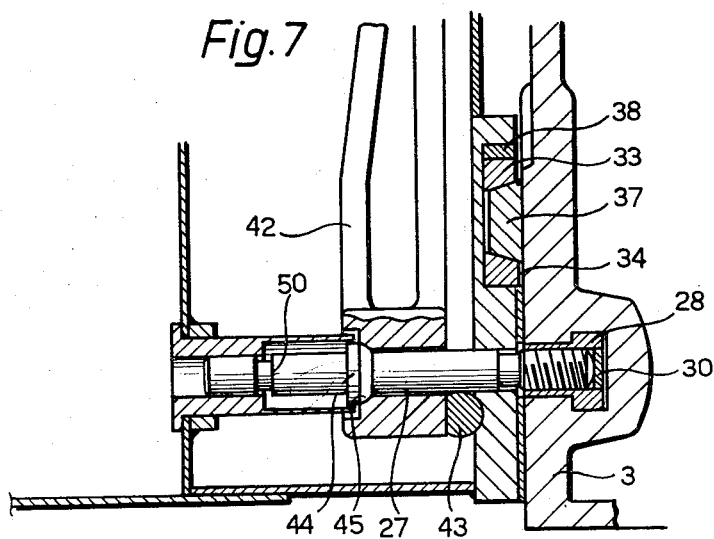
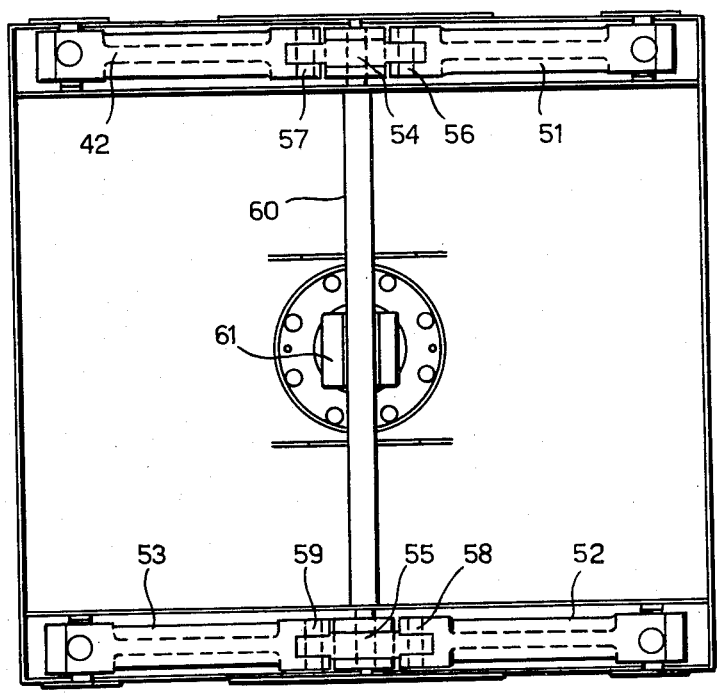

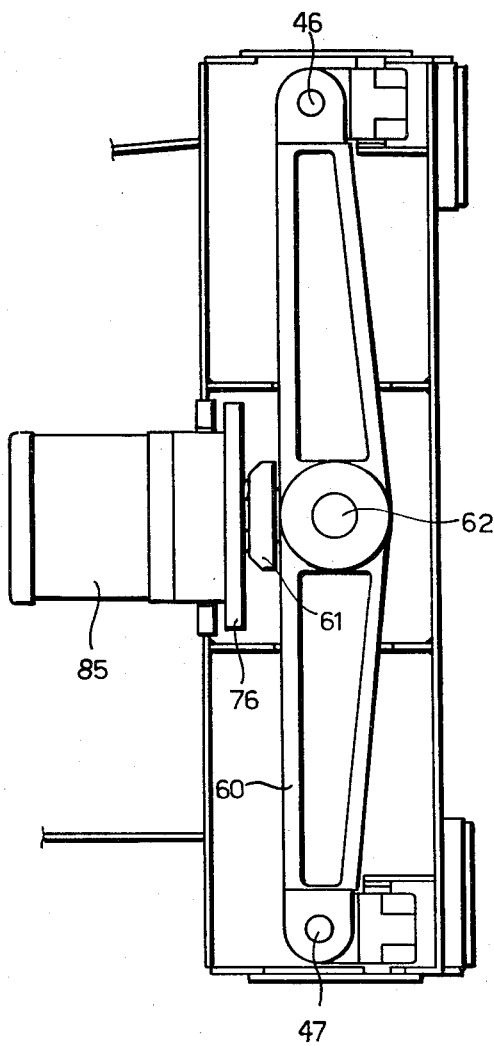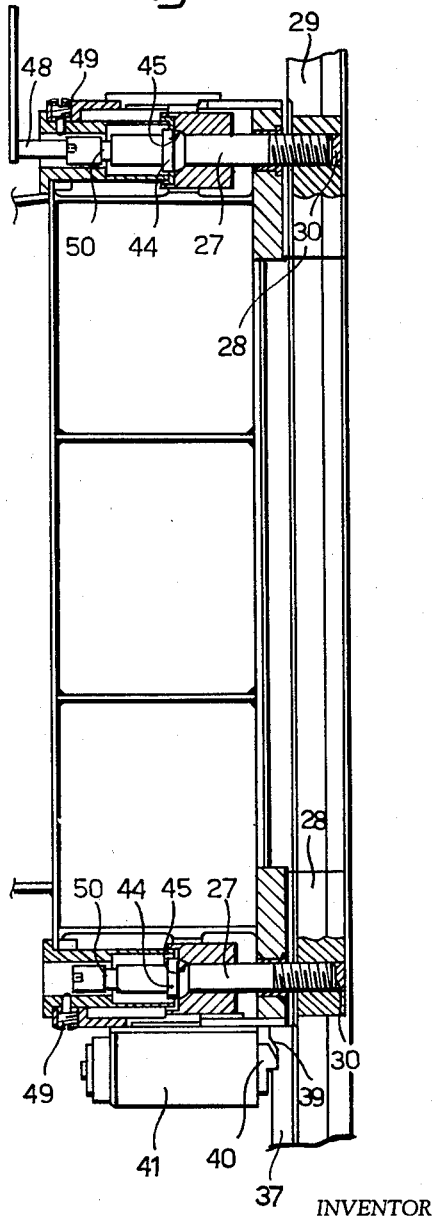

3,137,207
MILLING AND BORING MACHINE WITH DE-
TACHABLE TOOL HEAD CARRYING ARM
Charles William Berthiez, Milan, Italy, assignor to Innocenti Soc. Gen. per l'Industria Metallurgica e Meccanica, Milan, Italy
Filed Aug. 2, 1960, Ser. No. 47,047
Claims priority, application Italy Mar. 21, 1960
2 Claims. (Cl. 90—11)

This invention relates to detachable carrier devices for a tool head for carrying out turning, boring and milling operations on large workpieces.

It is known to carry out turning, milling and boring operations on large workpieces, by means of a large floor-type machine provided with an arm carrying a vertically disposed tool head arranged to co-operate with a revolving table, preferably movable over a bed in a direction perpendiclar to the direction of movement of the machine.

In machines of the above mentioned kind the arm carrying the tool head generally comprises a casting extending horizontally from an upright, and movable vertically along guideways fixed to the latter. The tool head is movable along horizontally extending guideways.

The tool head is arranged for turning workpieces and can be equipped with attachments for carrying out milling, boring, or drilling operations.

The tool head and the arm form a unit which is an integral part of the machine and which is connected to the machine by guide members, guideways, flanges, wedges, feed means, lead screws, grooved feed rods and locking means to the upright.

The arm is not always in continuous use during machining, particularly in the case of workpieces which do not necessitate a rotational movement. There are, therefore, periods during machining when the arm is not in use and impedes operation of the machine. Although when not in use, the arm can be moved to an inoperative position at the top of its upward stroke, the arm in such position nevertheless limits the height of the workpieces than can be admitted to the machine.

This difficulty has been avoided by providing an arm which is capable of angular movement in a horizontal plane to take up an inoperative position, so as to clear access to the machine.

When the arm is in said inoperative position whilst the machine is not employed in co-operation with the revolving platform the arm cannot be used at all.

According to the present invention there is provided a detachable carrier device for a tool head for carrying out turning, boring and milling operations on large workpieces, the device including an arm having the tool head displaceably arranged thereon, the arm being adapted to be detachably fixed to, the upright of a turning, boring and milling machine, a base for displaceably carrying the upright, a stationary table, or a rotatable platform for carrying the workpiece.

The arm is conveniently of light though rigid construction, being composed, for example, of welded sheet metal strongly ribbed to withstand bending and torque stresses, without vibrating. The arm may have bolted thereto an iron casting provided with guideways, carrying a lead screw and a splined rod for feeding the tool head horizontally and for vertically moving a tool slide. Driving may be effected via a gearbox from a shaft which may be coupled to control means, such as a reducing gear or power transmission means on the machine, the gearbox being arranged so that said feeding or slide movement may be selected as desired.

The arm is conveniently arranged to be readily locked to the upright of the machine or to other parts, for example a rotatable spider or a carriage by means of four bolts of large cross-sectional area, the threaded bolt shanks being engaged in tapped holes in lugs of T-shaped cross-section guided in complementarily shaped grooves in the forward face of the vertical upright.

In order firmly to secure the arm at a desired height on the upright, there may be provided a hydraulically operated latch for engaging by notches in a key of trapezoidal cross-sectional shape bolted extending longitudinally of the upright, the notches being 10 centimeters apart, whereby the height of the arm can be readily determined. The key guides the arm in co-operation with two pairs of similarly shaped lugs secured to the attachment face of the arm.

The tool head may be of the usual type employed in vertical lathes having a slide for performing an extensive longitudial stroke and can, if desired, be arranged to be capable of angular movement.

Preferably a shaft of large cross-sectional area is arranged within the tool slide and is arranged to be driven from a variable speed reducing gear arranged at the top of the slide.

The lower end of the shaft is arranged for coupling to the shaft of a detachable milling and boring head comprising two tool spindles arranged with orthogonal axes for machining in a vertical or horizontal plane.

The head may comprise an upper cylindrical portion received by a recess in the lower end of the slide, within which said portion is secured by means of a snap lock device. Various turning tool holders can be attached for operation by means of the recess and snap lock device.

The extent of the various displacements can be checked by means of known straight edges and verniers. Safety contacts are arranged at the extreme positions, hand-operated locking means fixedly securing the tool head to the arm and the slide to the tool head.

The arm and tool head unit can be used either in a vertical or horizontal position, the slide and tool head being balanced by means of a hydraulic mechanism in such a manner that the slide or tool head with the arm horizontally or vertically arranged receives the required balancing force.

The required electrical leads and cables for the power supplies are conveniently sheathed and provided with a multiple contact plug for connection to the general circuit of the machine.

The arm can be removed from the machine by means of a frame provided with rollers, the arm being disposed horizontally.

The arm is mainly intended for machining workpieces secured to a revolving platform, the arm being secured, so as to extend, horizontally to the upright of the machine. For securing the arm and tool head unit as aforesaid the unit can be lifted by means of cables of suitable length drawn by a mobile crane, the unit being held in a horizontal position, and being placed on a supporting frame previously secured to a table provided with rollers. In this case the upright is positioned with respect to the arm, to bring the bolts and trapezoidal guide lugs substantially into alignment. The arm is then moved on its supporting frame so that its attachment face abuts the upright. The bolts are screwed into the lugs seated in the T-shaped grooves in the upright, to maintain the co-operating faces of the arm and the upright in contact without locking them together. The trapezoidal lugs co-operate with one another for vertically guiding the arm.

The above arrangement of the arm is unsuitable for turning and indexing very large workpieces, since the stroke length of the tool head on the arm and diameter and power of the platform are insufficient for this purpose. The arm is therefore secured to the revolving platform itself, the tool revolving within the workpiece which is bolted to a stationary table.

The machine itself is thus freed and can be utilised for machining other workpieces.

The arm is secured in a vertical position within the interposition of an intermediate base to a spider bolted to the revolving platform. The base is provided with tapped holes and trapezoidal reference keys for positioning the arm. The arm is secured to the base by the same means as are employed for attaching it to the upright. The base is equipped with a reduction gear feed unit for operating the tool head and slide.

Machining workpieces secured to the revolving platform by rotation and indexing, which workpieces do not require considerable radial stroke lengths or large milling or boring power, can be accomplished by arranging the arm vertically on a carriage movable along the machine bed. In this case also the machine is free and can thus be utilised for machining other workpieces.

The carriage may include a reducing gear adapted to feed the tool head and tool slide in the manner above described, and also to feed the carriage on the bed. The arm is assembled in the manner above described.

When machining stationary workpieces of considerable length, the main operations may usefully be performed by means of the machine, secondary operations being performed by the arm which is arranged to act as an auxiliary machine and is disposed on a carriage.

By providing a further movable carriage on the other side of the machine, auxiliary operations can be performed on the workpiece by the arm independently of the position of the machine. In the case of large workpieces the arm can conveniently be employed for machining a face of the workpiece other than the face worked by the machine, the arm being arranged on a carriage displaceable along a detachable bed.

The workpiece can, for example, be secured in a vertical position, to the table or to the periphery of the revolving platform, for carrying out external turning, milling, boring operations on a workpiece which is being rotated or indexed.

Alternatively, the arm can be secured in a horizontal position to an auxiliary upright which is either fixedly or movably secured to a bed.

Moreover, machining on an oblique plane can be performed by attaching the arm to an inclined base.

For a better understanding of the present invention and to show how the same may be carried into effect, reference will now be made to the accompanying drawings, in which like designations indicate like parts and in which:

FIGURE 2 is a plan view of the machine shown in FIGURE 1;

FIGURE 5 is an end elevational view of the arrangement shown in FIGURE 4;

FIGURE 6 is a cross-sectional view of the arm locking device;

FIGURE 7 is a view partly in axial section of a detail of the arrangement shown in FIGURE 6;

FIGURE 8 is an end view of the arm;

FIGURE 9 is a sectional view on the line XII—XII of FIGURE 6, the arm being shown in the locked conditions;

FIGURE 10 is a view in the direction of arrow X, of FIGURE 6 with covering plate removed;

Figure 1:
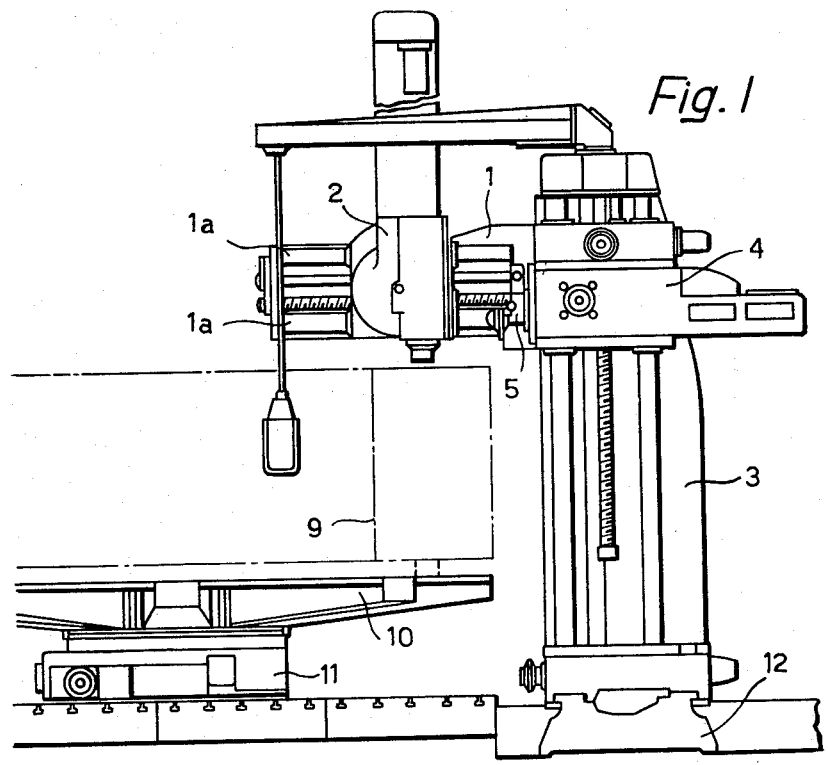
FIGURE 1 is a front elevational view of the milling and boring machine having an arm according to the invention carrying a tool head and secured to an upright of the machine.

The manner in which the arm is attached to the upright of a milling and boring machine will now be described with reference to FIGURES 1 and 2.

The device of the invention includes a supporting member hereinafter referred to as the arm 1 provided with guideways 1a along which a tool head 2 carrying a mandrel and tool is mounted so as to be slidably displaceable.

In this embodiment the arm 1 along which the tool head 2 is slidably displaceable, is secured so as to extend horizontally, to an upright 3 of the milling and boring machine. A transmission gearbox 5 is arranged to be actuated by a power transmission means 6 provided on carriage 4, to which the arm 1 is fixed for rotating the tool. A gearbox 7 fixedly attached to the arm 1 is arranged to feed the arm along the guides 1a and is coupled to the gearbox 5 by means of a sleeve 8. The position of the tool head 2 transversely of a workpiece 9 secured to a spider 10 fixedly attached to a rotary platform 11, can be adjusted by displacing the upright 3 along a bed 12.

Figure 3:
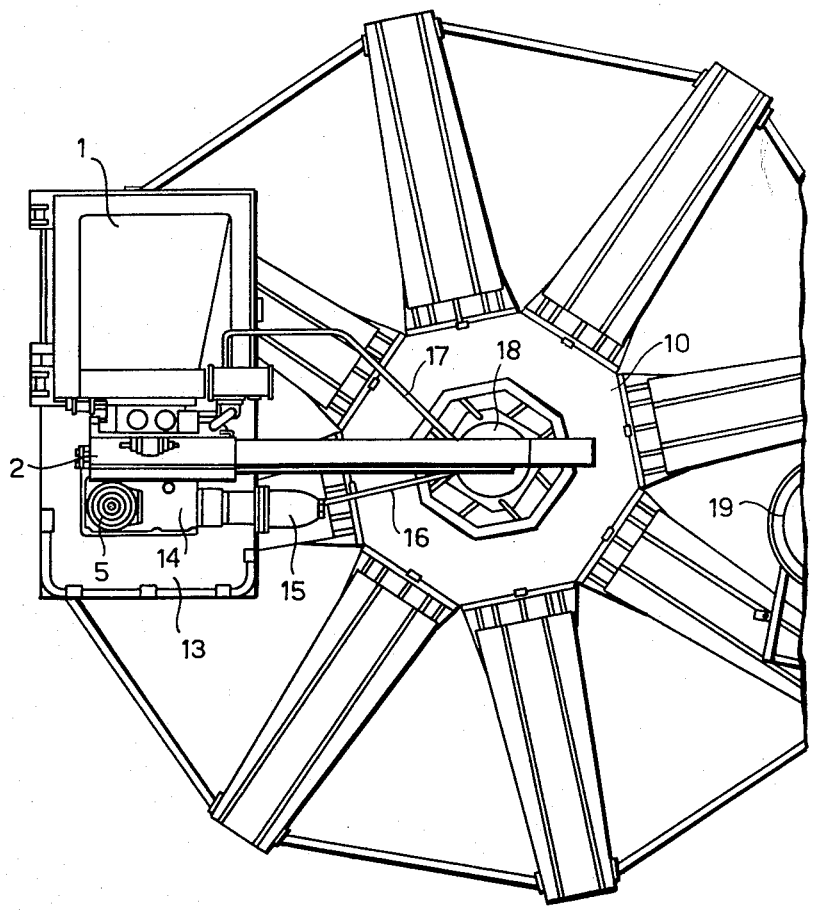
FIGURE 3 is a plan view of the arm vertically secured to a detachable base fixedly attached to a rotary platform.

According to a second arrangement of the arm as shown in FIGURE 3, the arm 1 is locked in a vertical position on a base 13 bolted to the spider 10 fixed to the rotary platform 11. The transmission gearbox 5 is connected to a power transmission means 14 arranged to be driven by a motor 15.

Electric current is supplied to the arm assembly through cables 16 and 17 connected to a slip-ring unit 18.

The spider 10 is balanced by means of a counterweight 19 secured on the spider 10 diametrically opposite the base 13.

Figure 4:
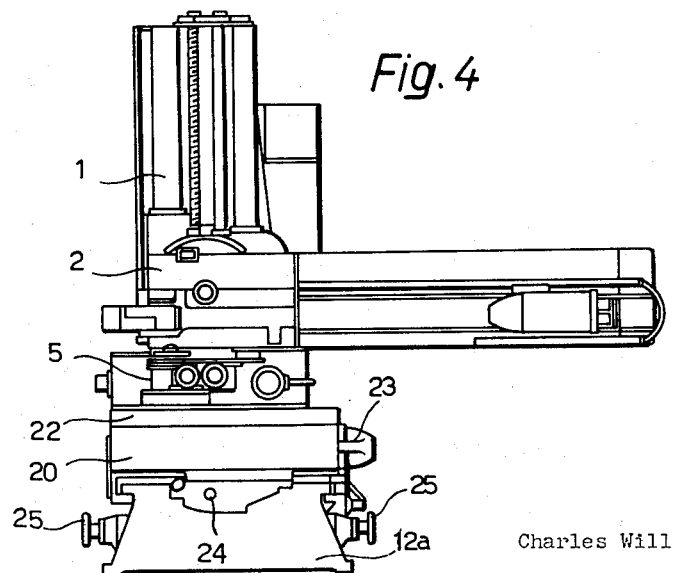
FIGURE 4 is a front elevational view of the arm vertically attached to a carriage movable along a detachable bed.

According to a further arrangement of the arm, as shown in FIGURES 4 and 5, the arm 1 is mounted on a carriage 20 displaceable along a detachable auxiliary base 12a or along that base of the machine. The gearbox 5 is connected to a power transmission device 22 drivable by a motor 23 which is also arranged to feed via transmission members of known type (not shown) the carriage 20 by means of a lead screw 24. Lifting eyebolts 25 are provided for manipulating the unit where a detachable bed is employed, i.e. the bed 12a.

The arm 1 can alternatively be equipped with a self-contained motor reduction gear for controlling the feed thereof without mechanical connection to the machine.

An embodiment of the arm 1 will now be described with reference to FIGURES 6 to 10, means for locking the arm 1 to the upright 3 of the milling and boring machine being described in detail.

The arm 1 is constructed of welded strongly ribbed sheet metal, so as to be light in weight and capable of withstanding stresses without vibrating.

Four screws 27 guided in recesses in the arm are screwed into corresponding slider 28, of T-shaped cross-sectional configuration, seated in vertically extending grooves 29 in the upright 3 of the machine.

A plug 30 screwed into each slider 28 limits the axial displacement of the screws 27, so that when the ends of the screws 27 abut the plugs 30, the arm 1 bears slidingly against the upright 3, but is not locked thereto.

The approach of the arm 1 to the upright 3 causes trapezoidal lugs 33, 34, on the pads of the arm 1 mutually to engage a key 37 of trapezoidal cross-sectional configuration extending longitudinally of the upright 3 and fixed thereto. A shim 38 (FIGURE 7) is arranged for adjusting the spacing between the lugs 33, 34, so that they engage the key 37 without play.

The key 37 is provided with notches 39 (FIGURE 9) spaced from each other by 10 cms. and engageable by a latch 40 guided in a cylindrical casing 41 carried by the arm 1.

The rear end of the latch 40 is arranged to be acted upon by a double-acting piston (not shown), which can receive oil under pressure on either face thereof for axially displacing the latch.

In order to lock the arm 1 to the upright 3 the screws 27 already screwed into sliders 28 are axially displaced by means of levers 42, 51, 52, 53, each of which is fulcrumed relatively the arm 1 by means of a member 43 fixedly attached to the end portion of each of said levers and bearing against an abutment plate of the arm 1. Each lever engages by means of a semispherical seat 45 a corresponding semispherical abutment 44 provided on a shank of each screw 27. When the arm is transported from one working position to another, the screws 27 are kept in their retracted inoperative positions by means of grub screws 49, each engaging a circumferential groove 50 in the screw shank. The screws 27 are also operable by means of a spanner 48 (FIGURE 9).

The levers 42 and 51, 52 and 53 are connected in pairs to hinge members 54, 55 by means of pins respectively 56, 57, 58, 59 (FIGURE 8). The hinge members 54, 55 are connected to a beam 60 by means of pins 46, 47 (FIGURE 10). The beam 60 is connected by means of a pin 62 to a piston rod 61 actuable by hydraulic arm locking control means such as an irreversible servo-motor 85 of known type rigidly fixed to the arm 1.

Figure 11:
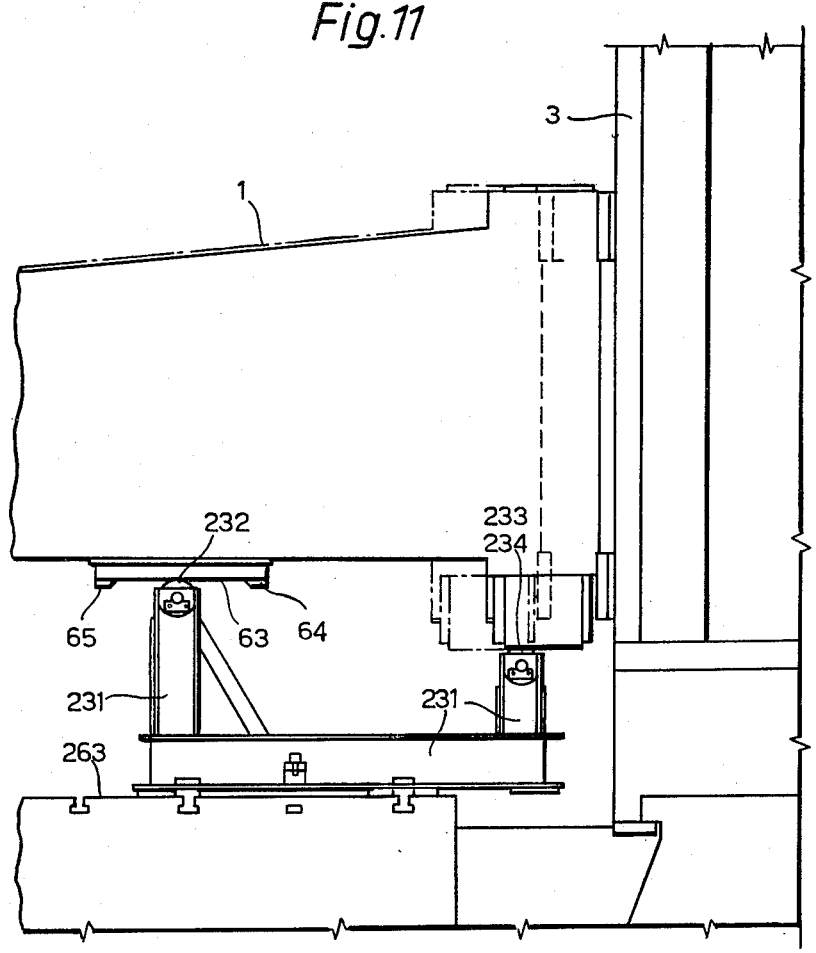
FIGURE 11 is a front elevational view of supporting means for the arm.

The arm 1 is also provided with three flat tracks 63 for co-operation with rollers, namely a control track and two further tracks on each side of the control track. Each track is provided with two stop lugs 64, 65. The tracks 63 extend longitudinally of the arm 1 as shown in FIGURE 11.

Figure 12:
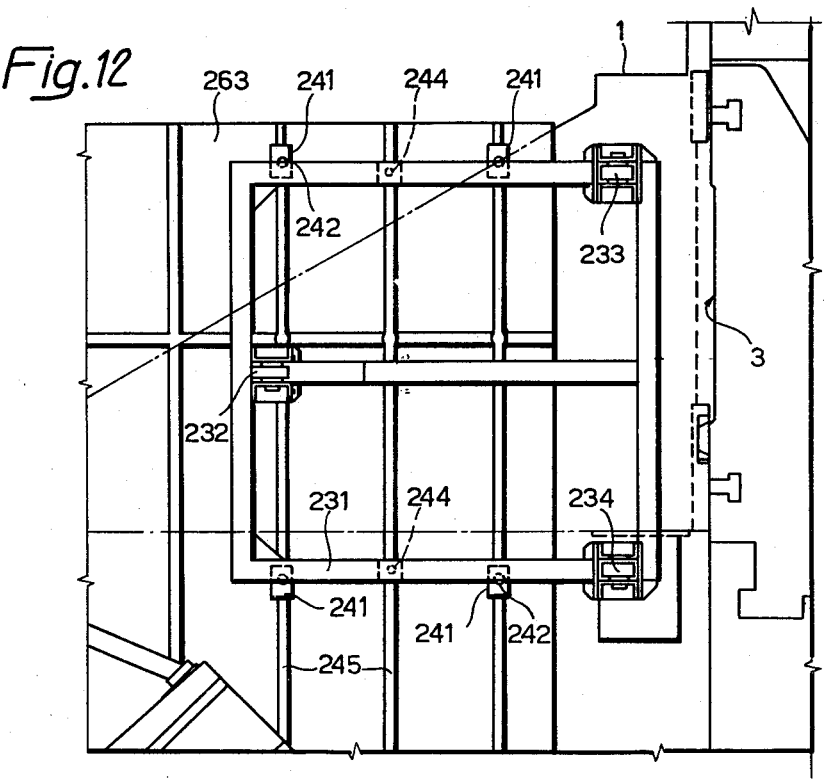
FIGURE 12 is a plan view of FIGURE 11.

An embodiment of a device for facilitating assembly and horizontal positioning of the arm on the machine will now be described with reference to FIGURES 11 and 12.

This device includes a metal frame 231 composed of welded structural members carrying three rollers 232, 233, 234.

In order to assemble the arm 1 on the upright 3, the frame 231 is secured to a stationary table 263 in a desired position by means of four flanges 241 and four bolts 242 which are engaged by T-shaped grooves 245 in the stationary table 263.

The frame 231 is positioned with respect to the machine by means of two vertically displaceable latches 244 engaged by the respective T-shaped grooves 245.

The arm 1 is placed on the frame 231 so that the three tracks 63 of the arm 1 are in operative contact with rollers 232, 233, 234. Lugs 64 and 65 limit the horizontal displacement of the arm 1.

The arm 1 is subsequently moved towards the upright 3 which has been previously brought to a suitable transverse position.

Figure 13:
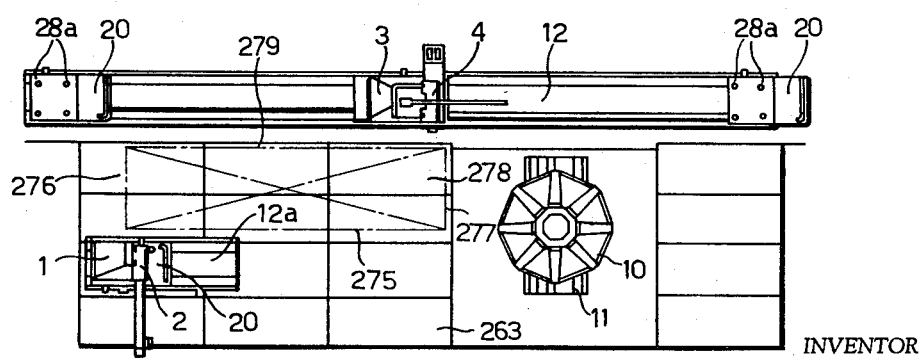
FIGURE 13 is a diagrammatical plan view showing the arm mounted on a detachable bed.

It is possible, as shown in FIGURE 13, to assemble the arm 1 on a carriage 20 movable over a detachable base 12a secured to the table 263. The arm 1 is fixed to the carriage 20 by screwing each of the screws 27 into corresponding tapped holes 28a provided in the top plate of each carriage in a similar manner to those in the intermediate base 13. With this arrangement the faces 275, 276, 277 of a workpiece 278 secured to the table 263 can be machined by means of the arm 1, while the machine acts on the face 279 of the workpiece 278.

What I claim is:

1. In a milling and boring machine, an elongated horizontal work-supporting unit comprising a fixed table, a rotary table and work-supporting face on each table; a horizontal slideway adjacent to and extending lengthwise of said work-supporting unit; an upright slidably mounted on said horizontal slideway, a vertical slideway on said upright comprising a vertically extending key, two mutually spaced mounting grooves parallel to said key of a T-shaped cross section, and a slider means slidably mounted in each groove; a tool head-carrying arm detachably mounted on said vertical slideway to horizontally extend over said work-supporting unit, an attachment face on one end of said arm, a plurality of axially retractable fixing screws extending perpendicularly through said face and screwable into the sliders, a pair of pads fixed on said face and complementary to said key and means for axially displacing said screws, whereby said arm can be slidably located and fixedly attached to said vertical slideway; an auxiliary base detachably fixed to the work-supporting face on the fixed table and a horizontal slideway on said base; a carriage slidably mounted on the first mentioned horizontal slideway, a carriage slidably mounted on the second mentioned horizontal slideway, each carriage comprising a horizontal arm-supporting plate having a plurality of tapped holes spaced corresponding to said screws on the arm, whereby said screws of the arm can be screwed into said holes for attaching the arm to said carriage; a base detachably fixed on the rotary table, a horizontal upwardly facing arm-supporting plate on said base, having a plurality of tapped holes spaced correspondingly to said screws on the arm, whereby said screws of the arm can be screwed into said holes for attaching the arm to said base.

2. A milling and boring machine as claimed in claim 1, wherein said arm comprises four axially retractable fixing screws, a semispherical abutment fixed on the shank of each screw, four hydraulically operated levers hingedly attached to said arm each lever having a semispherical seat for engaging said abutment, whereby by simultaneously actuating said levers a simultaneous axial displacement is imparted to said screws.

References Cited in the file of this patent

UNITED STATES PATENTS

| | | |
|---|---|---|
| 693,015 | Hess | Feb. 11, 1902 |
| 1,750,200 | Spahn | Mar. 11, 1930 |
| 1,907,550 | Knowles | May 8, 1933 |
| 2,074,426 | Poole | Mar. 23, 1937 |
| 2,358,389 | Ewart et al. | Sept. 19, 1944 |
| 2,897,706 | Berthiez | Aug. 4, 1959 |

FOREIGN PATENTS

| | | |
|---|---|---|
| 687,335 | Great Britain | Feb. 11, 1953 |
| 1,098,999 | France | Mar. 16, 1955 |
| 1,222,885 | France | June 14, 1960 |